United States Patent
Rayburn et al.

[11] Patent Number: 5,818,891
[45] Date of Patent: Oct. 6, 1998

[54] ELECTROSTATIC CONTAINMENT FUSION GENERATOR

[76] Inventors: David C. Rayburn, 2731 Blairstone Rd., #26, Tallahassee, Fla. 32301; Nicholas Angelo Providakis, 2625 Colony Rd., Stanhope, N.J. 07874

[21] Appl. No.: 647,023

[22] Filed: May 8, 1996

[51] Int. Cl.⁶ .................................................. G21B 1/02
[52] U.S. Cl. .............................................................. 376/107
[58] Field of Search ............................................. 376/107

[56] References Cited

U.S. PATENT DOCUMENTS

| | | | |
|---|---|---|---|
| 2,961,558 | 11/1960 | Luu et al. | 376/107 |
| 3,120,475 | 2/1964 | Bennett | 376/107 |
| 3,258,402 | 6/1966 | Farnsworth | 376/107 |
| 3,386,883 | 6/1968 | Farnsworth | 376/107 |
| 3,527,977 | 9/1970 | Ruark | 376/107 |
| 3,530,036 | 9/1970 | Hirsch | 376/107 |
| 3,533,910 | 10/1970 | Hirsch | 36/107 |
| 4,189,346 | 2/1980 | Jarnagin | 176/5 |
| 4,202,725 | 5/1980 | Jarnagin | 176/5 |
| 4,397,180 | 8/1983 | Wolff et al. | 73/119 |
| 4,416,845 | 11/1983 | Salisbury | 376/107 |
| 4,434,130 | 2/1984 | Salisbury | 376/107 |
| 4,639,348 | 1/1987 | Jarnagin | 376/107 |
| 4,788,024 | 11/1988 | Maglich et al. | 376/107 |
| 5,034,183 | 7/1991 | Blewett | 376/107 |
| 5,160,694 | 11/1992 | Steudtner | 376/107 |

*Primary Examiner*—Harvey E. Behrend
*Attorney, Agent, or Firm*—Peter Loffler

[57] ABSTRACT

An electrostatic containment fusion generator is comprised of a generally spherical capacitor having an outer plate at ground and a negatively charged inner plate. A reaction chamber, comprised of two pairs of spaced apart permanent magnets, is disposed within the inner plate. An ion source means provides a deuteron beam to enter into a figure-8 orbit between the two pairs of magnets. A Faraday cage exists between the two pairs which neutralizes space charge in the center region of the beam. An arced cut portion on each magnet assists in the beam's entry into the Faraday cage, while a path correction means corrects the effects of the inverse field created by the cut portion. Dual beam establishment means are also provided.

17 Claims, 5 Drawing Sheets

ELECTROSTATIC CONTAINMENT FUSION GENERATOR

BACKGROUND OF THE INVENTION

1. Field of the Invention

The present invention relates to a nuclear reaction generation system and more specifically to a fusion generator relying on electrostatic and magnetic containment of the circulating nuclear fuel.

2. Background of the Prior Art

Substantial effort, both theoretical and practical, has been expended in developing a self-sustaining nuclear fusion generation system. Achievement of such a system will tend to move man from the relatively dirty fossil fuel burning and fission systems to an energy source that is cleaner, cheaper and more reliable.

Current fusion efforts center on a triton-deuteron reaction. Fusion reactions occur within a magnetically contained, heated plasma. Such systems suffer from substantial drawbacks. Tritium which is expensive, requires lithium shielding, shielding is also expensive. Furthermore, such systems are very inefficient at low temperatures. Their efficiency increases with an increase in temperature of the plasma which temperature increase is achieved by an increase in plasma size. Producing such a large plasma is extremely expensive and prohibits small-scale applications such a fusion generator-powered submarine.

A fusion generator is needed that overcomes the extreme cost and inefficiency of current generators. Such a system should eliminate the need for tritium and lithium and should be functional on a small scale. Ideally, such a system will be safe and reliable to operate.

SUMMARY OF THE INVENTION

The electrostatic containment fusion generator of the present invention overcomes the aforementioned needs in the art. The present invention provides an electrostatic containment fusion generator that relies on deuterium, without the need for tritium or lithium, in order to achieve its fusion reaction. The electrostatic containment fusion generator improves efficiency with a reduction in device size thereby increasing the utility of the device.

The electrostatic containment fusion generator of the present invention comprises a generally spherical capacitor having an outer plate at ground and a negatively charged inner plate. The two plates have a potential difference on the order of 150,000 volts. The inner plate is comprised of a wire mesh having a thin foil covering.

The reaction chamber, disposed within the inner negative plate, is comprised of two pairs of spaced apart permanent magnets. The primary magnetic fields between each pair of magnets are in opposite direction to the fields in the other pair of magnets. An ion source connected to a deuterium source regulator via a gas feed tube provides a deuteron beam that enters into the reaction chamber and establishes a figure-8 orbit between the two pairs of magnets. A Faraday cage exists between the two pairs in order to neutralizes space charge in the center region of the beam. An arced cut portion on each magnet assists in the beam's entry toward and into the Faraday cage while a path correction means corrects the effects of the inverse field created by the cut portion.

Particle collisions occur at the cross-over region of the figure-8 beam path. Higher the collision rates result in higher reaction rates. Decreasing beam radius results in increased beam density and the higher collision rates. Therefore, size reduction of the device results in higher reaction rates and thus increased efficiency. The device can in constructed on a small scale resulting in decreased cost and increased utility.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
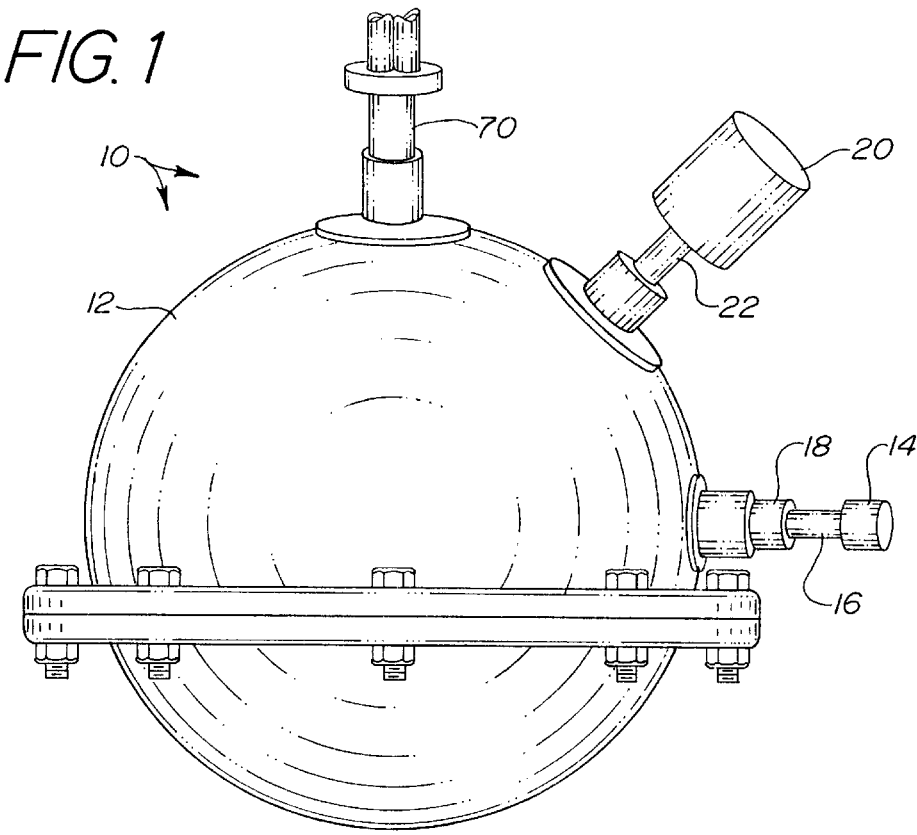
FIG. 1 is a side elevation of the electrostatic containment fusion generator of the present invention.
Figure 2:
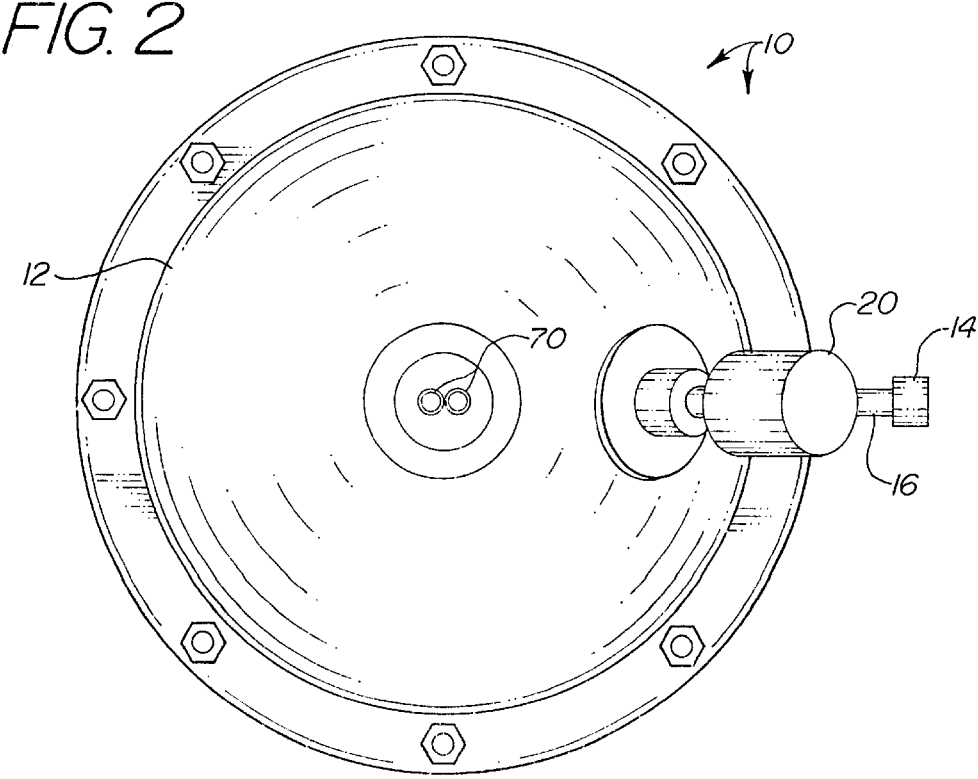
FIG. 2 is a plan view of the electrostatic containment fusion generator.
Figure 3:
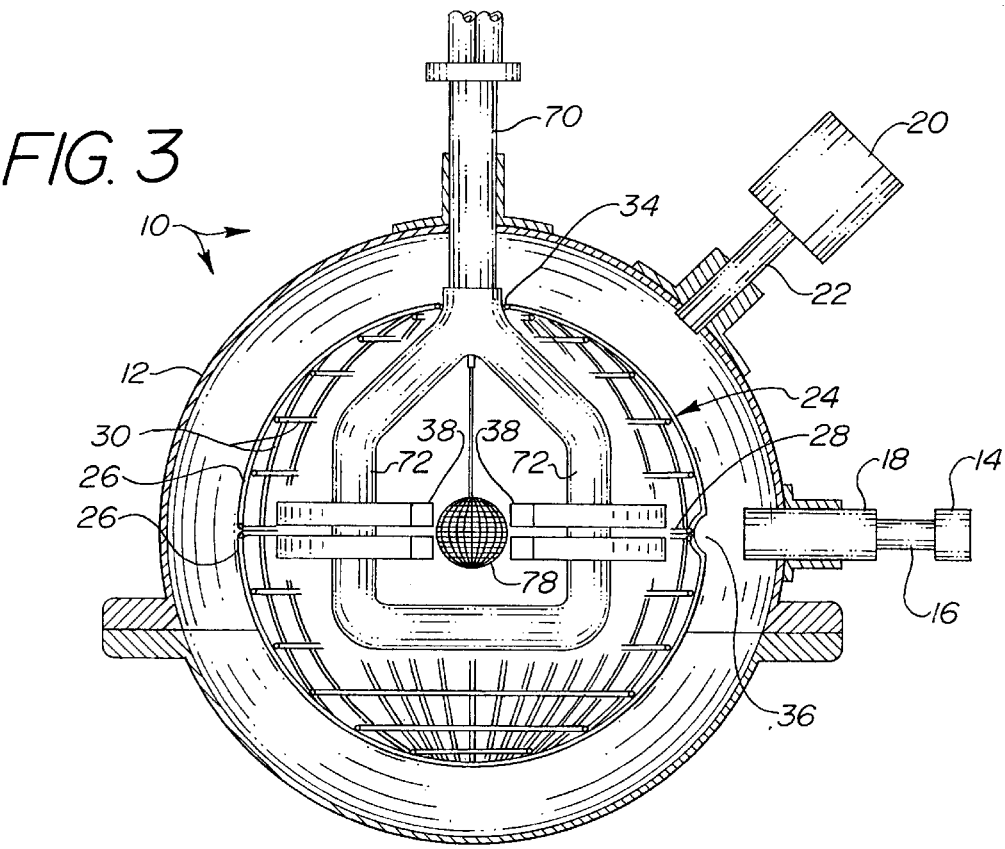
FIG. 3 is a partially sectioned elevation of the electrostatic containment fusion generator.
Figure 4:
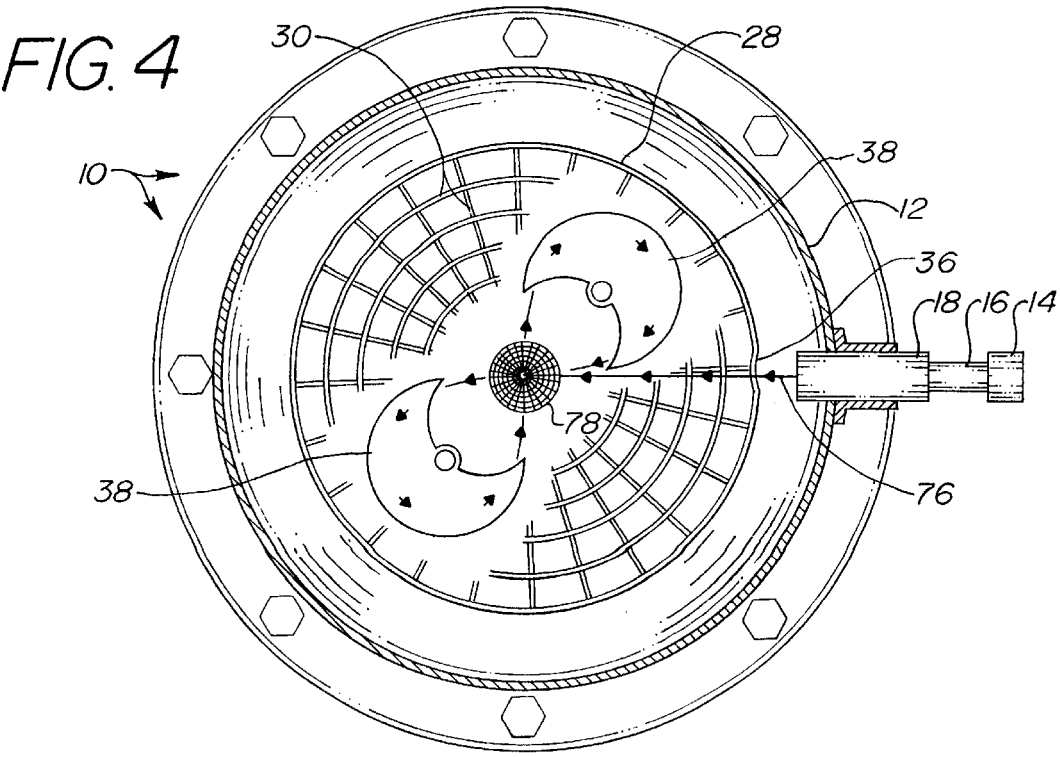
FIG. 4 is a horizontal section of FIG. 3.

Referring to the drawings, it is seen that the electrostatic containment fusion generator of the present invention, generally denoted by reference numeral 10, comprises a generally spherical-shaped, fully enclosed main containment vessel 12 having various sealed access ports. The main containment vessel 12 is a positive plate which is at ground. The positive plate 12 can be made from lead, stainless steel, lead-steel mix, titanium, aluminum, an alloy, or the like. The device 10 will be radiation shielded in any appropriate fashion.

A deuterium source regulator 14 is located external of the containment vessel 12. A gas feed tube 16 extends from the deuterium source regulator 14 and passes into the interior of the containment vessel 12 and connects to an ion source 18. The ion source 18 strips electrons from the deuterium gas producing positively charged deuterons.

A vacuum pump assembly 20 is located external of the containment vessel 12. A vacuum tube 22 extends from the vacuum pump assembly 20 and terminates within the containment vessel 12.

Figure 5:
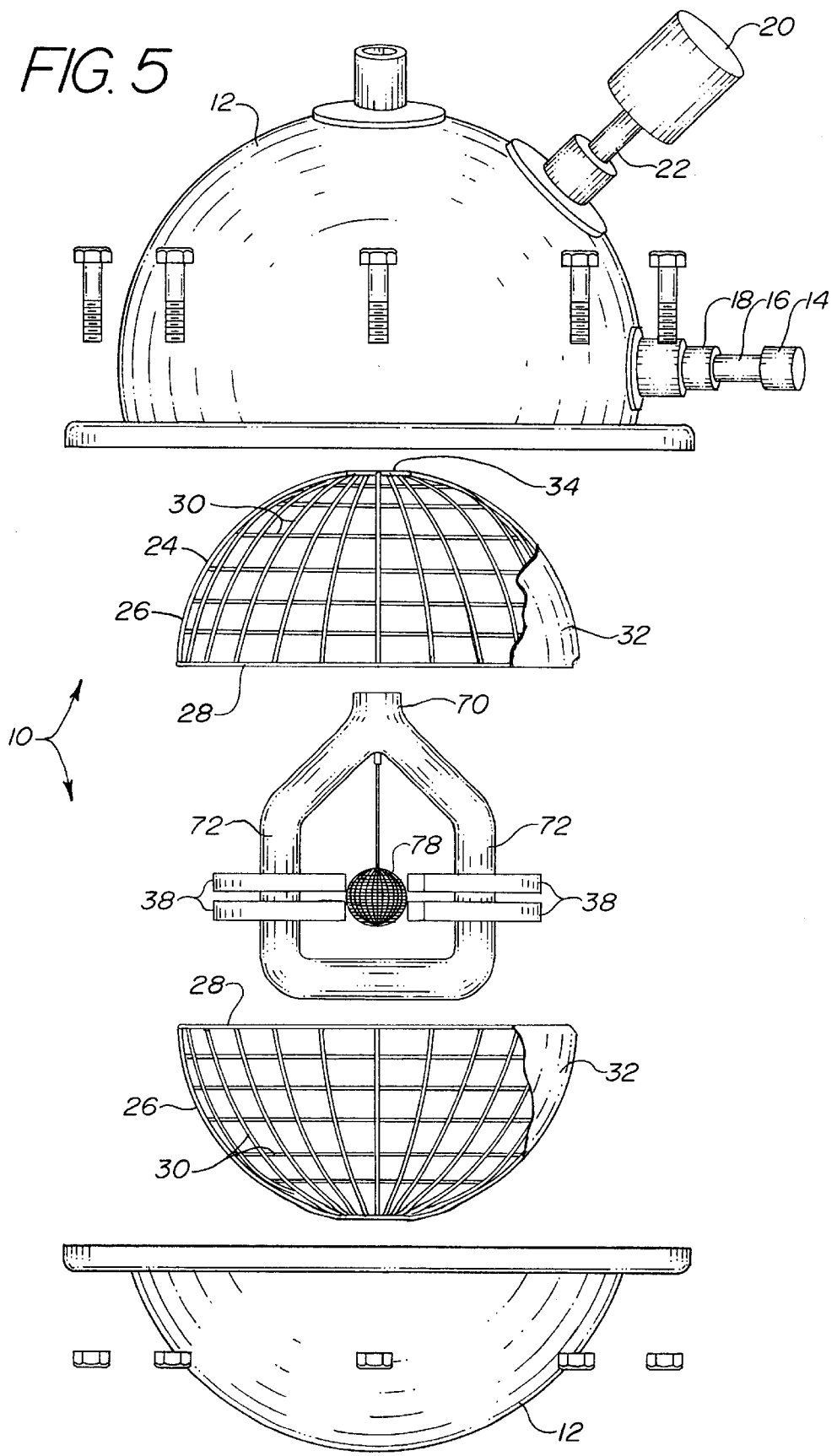
FIG. 5 is an exploded view, with portions rotated for clarity, of the electrostatic containment fusion generator.

Centrally located within the containment vessel 12 is a spherical-shaped negative plate 24 which is negatively charged. As seen in FIG. 5, the negative plate 24 is comprised of two opposing semi-spheres 26 each having an encompassing metal strip 28 defining its base. A wire mesh 30 disposed both longitudinally and latitudinally from the metal strip 28 defines each semi-sphere 26. The wire mesh 30 can be constructed by laying evenly spaced longitudinal and evenly spaced latitudinal wires in a rectangular-shaped sheet. The sheet is wave-cut along the top and along the bottom and thereafter the sheet is rolled into a ball. This is identical to cutting a rectangular map for forming into a circular globe. Constructing the wire mesh 30 in this fashion will result in a mesh having uniform-sized openings. The wire mesh 30 may be formed in any other appropriate fashion.

A thin foil 32 may cover the wire mesh 30 on each semi-sphere 26. The thin foil 32 evenly distributes charge along the negative plate 24. The thin foil 32, which can be made from titanium, aluminum, nickel, or the like, is constructed to be as thin as possible, preferably having a thickness on the order of one micrometer or less. An aperture 34 is located on the top of each semi-sphere 26. An additional deuteron aperture 36 is located on one side of the negative plate 24. The deuteron aperture 36 is located radially across from the ion source 18.

The positive plate 12 and the negative plate 24, which are each extremely smooth in order to prevent arcing between the plates, form a spherical capacitor having a potential difference on the order of 150,000 volts. The charging of the two plates comes from any appropriate DC power source located external of the containment vessel 10. The DC power source also provides electrical power for the ion source 18 and the vacuum pump assembly 20. The DC power source will provide initial power to the system. Thereafter, the reactor will supply necessary electrical power.

Disposed within the interior space of the negative plate 24, is the reaction chamber. As seen in FIGS. 3–5 and 8, the reaction chamber is comprised of two pairs of powerful permanent magnets 38, each magnet having pole orientation as shown. The face of each magnet 38 is slightly sloped. The magnets 38 each have an arced portion 40 removed therefrom. A center portion 42 is retained along the arced portion cut line.

Figure 6:
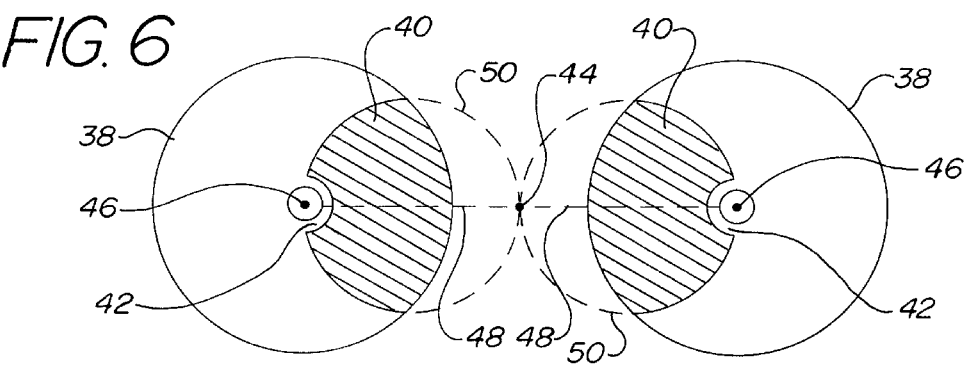
FIG. 6 describes the cut lines of the magnets.

As seen in FIG. 6, in order to determine the precise location of the arced portion cut area, the midpoint 44 between the two magnets 38 is identified. The midpoint 46 of each magnet 38 is also identified and a diameter 48 is identified between the two midpoints. A circle 50 is drawn having the diameter 48 identified. Half of the circle 50 is above the diameter 48 while the other half of the circle 50 is below the diameter 48. The circumference of the circle 50 that overlaps the magnet 38 is the arc portion 40 cut area, except for the center portion 42 that is retained. The other magnet 38 is cut in similar fashion.

Figure 7:
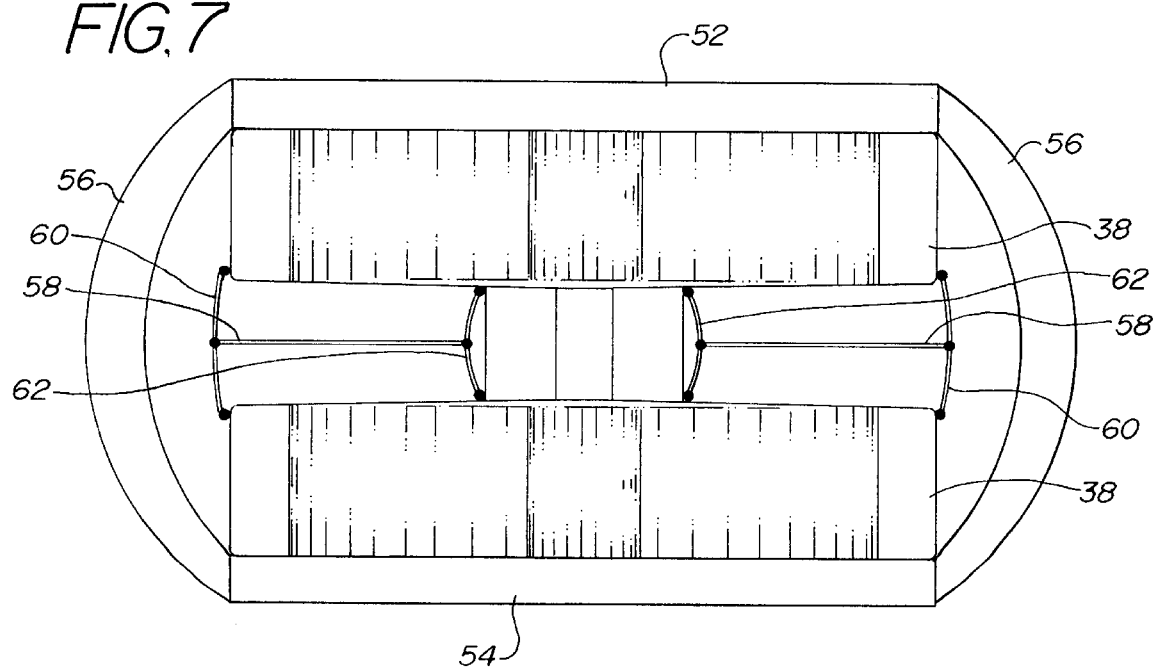
FIG. 7 is a side elevation view of a magnet pair viewed from the midpoint of the two magnet pairs.
Figure 8:
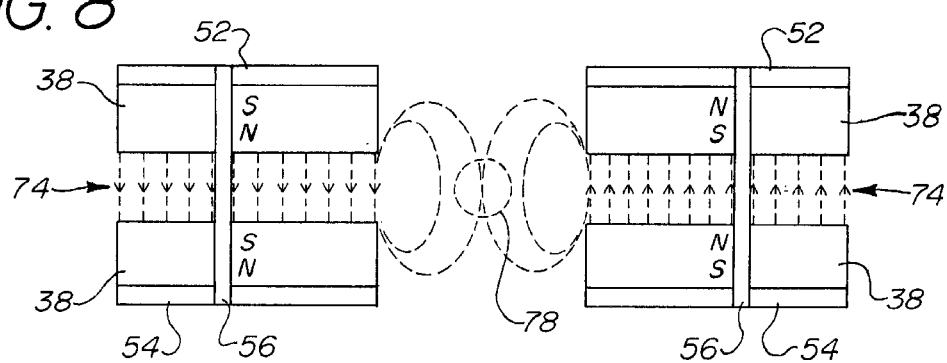
FIG. 8 is a flux diagram between the magnet pairs.
Figure 9:
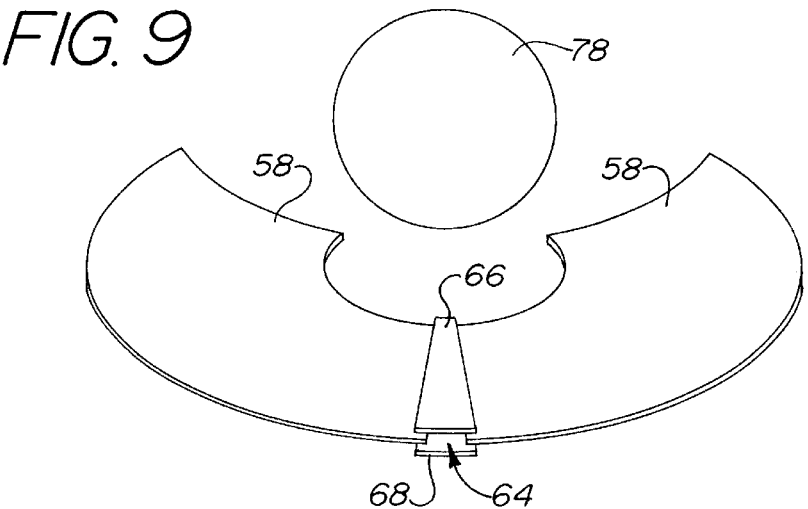
FIG. 9 illustrates the relative position of the deflection plates with respect to the central disk plate.
Figure 10:
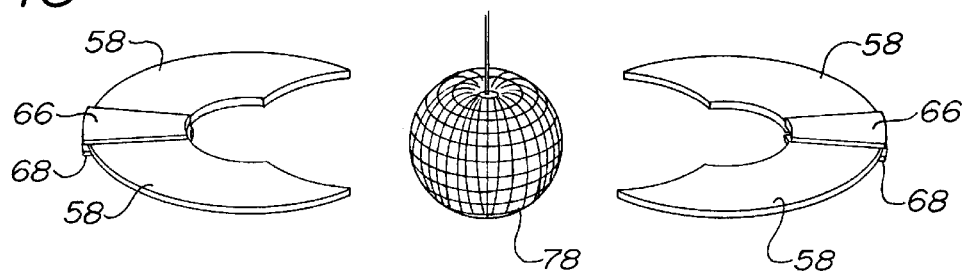
FIG. 10 is relative position of the central disk plates with respect to the Faraday cage.
Figure 11:
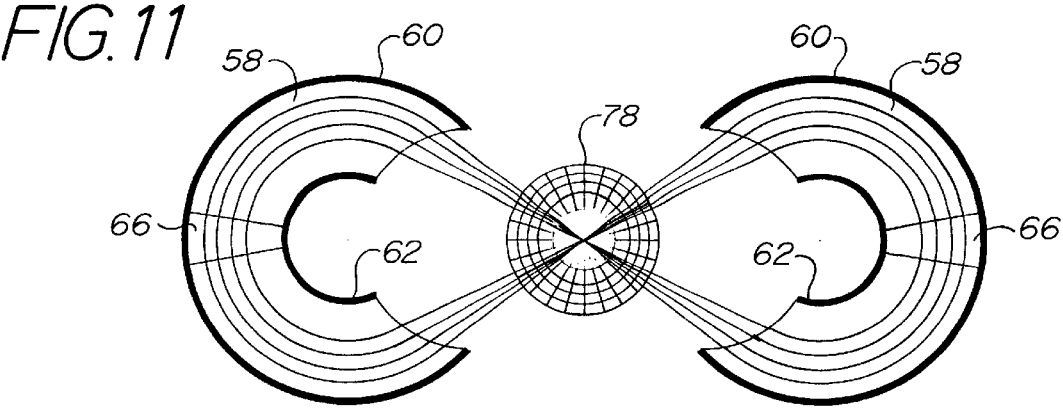
FIG. 11 illustrates the flow path of the deuteron beam.
Figure 12:
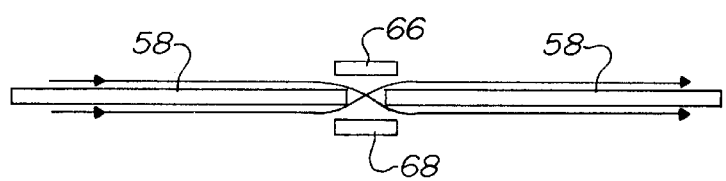
FIG. 12 is a side elevation view of FIG. 9 with both sets of plates present.

As seen in FIGS. 7 and 8, each pair of magnets 38 is yoked by any appropriate method. By way of example, a top plate 52 is connected to a bottom plate 54 by a pair of C-connections 56. The yoke assembly is made of a highly magnetically permeable material.

A central disk plate 58, in generally similar shape to the shape of the magnets 38, is disposed midway between each pair of magnets 38. A curved outer plate 60 holds one end of the central disk plate 58 while a curved inner plate 62, concentric with the outer plate 60, holds the other end of the central disk plate 58. The central disk plate 58 divides the region between the magnets 38 into an upper orbiting region and a lower orbiting region. The outer plate 60 and the inner plate 62 are each electrically insulated from each of the magnets 38 and from the central disk plate 58. A cut section 64 of the central disk plate 58 is removed. An upper deflection plate 66 and a lower deflection plate 68 are located equidistant above and below the cut section 64 of the central disk plate 58. The upper deflection plate 66 and the lower deflection plate 68 are equally charged and are positively charged relative to the central disk plate 58. All of the charged plates in the magnet assembly are negatively charged relative to the magnets 38, which magnets 38 are at the same potential as the negative plate 24.

A coolant tube 70 extends through an end of the containment vessel 12, and passes through the aperture of the lower semi-sphere 26 whereupon the coolant tube 70 forks. Each prong 72 of the fork passes through the center portion 42 of each of the pair of magnets 38. Fluid passes through the coolant tube 70 and removes heat from the magnets 38 during device operation. Heat removal is accomplished by convection (recirculating coolant) or by vaporization (static coolant). Cooling by blackbody radiation may also occur. The coolant tube 70 also provides support for each of the semi-spheres 26 and for each of the magnets 38.

As seen in FIG. 8, two primary magnetic fields 74 will be developed by the magnets 38. Secondary magnetic fields will also be developed but will not have effect upon the device. The primary magnetic fields 74 develop between the two magnets 38 within each pair. The two primary magnetic fields 74 will be opposite in direction to each other.

The deuterium source regulator 14 provides a deuterium flow through the gas feed tube 16 to the ion source 18 where the deuterium is stripped of electrons forming a deuteron beam 76. The deuteron beam 76 is accelerated by the potential difference arising within the containment vessel 12, into the reaction chamber. The deuteron beam 76 passes through the deuteron aperture 36 in order to avoid ionization energy losses due to beam passage through the negative plate 24.

The deuteron beam 76 enters the negative plate 24 with a trajectory perpendicular to the two primary magnetic fields 74. The ion source 18 is horizontally disposed and the deuteron beam moves along a horizontal trajectory to eliminate the effects of gravity upon the beam 76. Each individual primary magnetic field 74 will cause the deuteron beam to adopt circular paths of opposite direction in one of the orbiting chambers. Once the circulating beam 76 passes the cut out arced portion 40 of the magnets, the effect of the magnetic field 74 upon the beam 76 diminishes. This permits the beam 76 to shoot out toward the other pair of magnets 38 whereupon the beam 76 reenters a circular path. The end result is that of a figure-8 shaped deuteron beam path which forces particles in the beam 76 to remain in circulation for a relatively long period of time and causes the beam 76 to cross over itself repeatedly, thereby creating particle collisions. By symmetry, the negative plate 24 and the positive plate 12 have no effect upon the deuteron beam 76.

Just beyond the boundary of the magnets along the cut out arced portion 40, a slight inverse magnetic field exists. This inverse magnetic field will deflect the beam 76 with the result of deflecting the beam off of its figure-8 path. The positively charged outer plate 60 corrects the deflection of the beam 76 and permits it to retain its proper figure-8 path. Alternately, one of the magnetic pairs can be rotated clockwise while the other pair of magnetic pairs is rotated an equal amount counterclockwise in order to correct the beam deflection caused by the inverse magnetic field.

When the beam 76 passes the cut portion 64 in the central disk plate 58, the upper deflection plate 66 pushes the beam 76 from the upper orbit region into the lower orbit region while the lower deflection plate 68 pushes the beam 76 from the lower orbit region into the upper orbit region.

A Faraday cage 78 surrounds the crossing region of the deuteron beam. The Faraday cage 78, which is wired to the negative plate 24, is charged negatively, by induction, due to the presence of positive charges (the deuterons) within the negative plate 24. In addition, the Faraday cage and the central disk plate 58 draw negative charges to them due to the induced positive charge of the deuterons external to them. This balance has the effect of neutralizing space charge in the region of the beam path, resulting in a beam path radius reduction and beam density increase. Both factors contribute to an increased collision rate per time unit, and a higher reaction rate.

Collisions that result in fusion, follow one of two well known reactions with approximate equal probability:

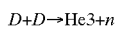

or

The particles of these reactions leave the collision area and travel out at high energies toward the positive plate 12. The passage of the particles between the negative plate 24 and the positive plate 12 is against an electric field so that energy transfers from the products to the circuit. As the thin foil 32, if used, is extremely thin, very little energy is lost to the negative plate 24. The particles, including the neutron which transfers no electrical energy due to lack of charge, dissipate any remaining energy in the form of heat upon collision with the outer plate or the shielding. The heat is converted into electrical energy in some standard fashion.

A vacuum in the UHV range (on the order of $10^{-7}$ Torr or better), is needed within the containment vessel 12 and is provided by the vacuum pump assembly 20. The vacuum between the negative plate 24 and the positive plate 12 is needed to act as an insulator to prevent arcing between the two plates and to minimize product particle ionization losses. The vacuum within the negative plate 24 is needed to minimize ionization losses to both the beam and product particles.

A device damping circuit of any appropriate design is provided for large overall beam modulation.

While the invention has been particularly shown and described with reference to an embodiment thereof, it will be understood by those skilled in the art that various changes in form and detail may be made without departing from the spirit and scope of the invention.

We claim:

1. An electrostatic containment fusion generator comprising:
   a generally spherical-shaped positive plate;
   a generally spherical-shaped negative plate, disposed within the positive plate;
   a first pair of generally cylindrical- or ring-shaped spaced apart magnets with a first midpoint and opposite poles facing, having a first arced portion removed, disposed within the negative plate;
   a second pair of generally cylindrical- or ring-shaped spaced apart magnets with a second midpoint and opposite poles facing vertically opposite the poles of the first pair of magnets, having a second arced portion removed, disposed within the negative plate in spaced apart relationship to the first pair of magnets with a third midpoint therebetween;
   a Faraday cage, disposed within the negative plate generally midpoint between the first pair of magnets and the second pair of magnets; and
   an ion source means, for providing a deuteron beam into the electrostatic containment fusion generator such that the deuteron beam is accelerated by the potential difference between the positive plate and the negative plate and the beam enters between the first pair of magnets and establishes an orbit therebetween until the deuteron beam passes over the first arced portion toward and thereafter through the Faraday cage and crosses over to the second pair of magnets wherein it establishes an orbit therebetween until the deuteron beam passes over the second arced portion toward and thereafter through the Faraday cage and crosses over to the first pair of magnets, establishing a figure-8 path such that collisions occur at the crossover region of the figure-8 path.

2. The device as in claim 1 wherein the first arced portion's boundary is the circumference of a first circle, having a diameter defined between the first midpoint and the third midpoint, that overlaps the first pair of magnets and the second arced portion's boundary is the circumference of a second circle, having a diameter defined between the second midpoint and the third midpoint, that overlaps the first pair of magnets.

3. The device as in claim 1 wherein the first pair of magnets is yoked and the second pair of magnets is yoked.

4. The device as in claim 1 further comprising:
   a first cooling means for cooling the first pair of magnets and a second cooling means for cooling the second pair of magnets.

5. The device as in claim 4 wherein the first cooling means comprises a first coolant tube passing through the first pair of magnets and the second cooling means comprises a second coolant tube passing through the second pair of magnets.

6. The device as in claim 1 wherein the negative plate is comprised of a wire mesh having a plurality of longitudinally disposed wires and a plurality of latitudinally disposed wires.

7. The device as in claim 6 wherein the wire mesh is covered by a foil.

8. The device as in claim 6 wherein the distance between each of the plurality of longitudinally disposed wires is equal and the distance between each of the plurality of latitudinally disposed wires is equal.

9. The device as in claim 1 wherein the negative plate is comprised of a lower half and an upper half that is detachable from the lower half.

10. The device as in claim 1 wherein the ion source means is comprised of:
    a deuterium source regulator, disposed external of the positive plate, for providing a source of deuterium;
    an ion source, for stripping electrons from deuterium gas, disposed between the positive plate and the negative plate; and
    a gas feed tube, for fluid connecting the deuterium source regulator to the ion source.

11. The device as in claim 1 further comprising a vacuum means for evacuating the interior of the electrostatic containment fusion generator.

12. The device as in claim 1 further comprising:
    a first curved outer plate attached to the outer circumference of the first pair of magnets in electrically insulated fashion;
    a second curved outer plate attached to the outer circumference of the second pair of magnets in electrically insulated fashion;
    a first curved inner plate, charged negative relative to the first outer plate, disposed between the first pair of magnets, concentric to the first outer plate, in electrically insulated fashion;

a second curved inner plate, charged negative relative to the second outer plate, disposed between the second pair of magnets, concentric to the second outer plate, in electrically insulated fashion;

a first central plate, charged negative relative to the first pair of magnets, having a first aperture, attached to the first curved outer plate and to the first curved inner plate between the first pair of magnets, creating a first upper orbit region and a first lower orbit region and splitting the orbit path of the deuteron beam between the first upper orbit region and the first lower orbit region;

a second central plate, charged negative relative to the second pair of magnets, having a second aperture, attached to the second curved outer plate and to the second curved inner plate between the second pair of magnets, creating a second upper orbit region and a second lower orbit region and splitting the orbit path of the deuteron beam between the second upper orbit region and the second lower orbit region;

a first deflection plate, charged positive relative to the first central plate, located above the first aperture for crossing the deuteron beam from the first upper orbit region into the first lower orbit region and a second deflection plate, charged positive relative to the first central plate, located below the first aperture for crossing the deuteron beam from the first lower orbit region into the first upper orbit region;

a third deflection plate, charged positive relative to the second central plate, located above the second aperture for crossing the deuteron beam from the second upper orbit region into the second lower orbit region and a fourth deflection plate, charged positive relative to the second central plate, located below the second aperture for crossing the deuteron beam from the second lower orbit region into the second upper orbit region.

13. The device as in claim 1 wherein the first arced portion is positioned clockwise relative to the first midpoint and the second arced portion is positioned counterclockwise relative to the first midpoint.

14. The device as in claim 1 wherein the device is nuclearly shielded.

15. The device as in claim 1 to further include means for providing overall deuteron beam modulation.

16. The device as in claim 1 to further include means for converting the kinetic energy of the product particles to electric energy.

17. The device as in claim 16 wherein the electrical energy powers the vacuum means and the ion source means.

* * * * *